United States Patent
Holdham

[15] 3,696,762
[45] Oct. 10, 1972

[54] FOLDABLE PLATFORM DEVICE

[72] Inventor: Bertram Roy Holdham, Eastleigh, England

[73] Assignee: Polydesigns Limited

[22] Filed: June 24, 1969

[21] Appl. No.: 835,967

[52] U.S. Cl. .......................108/134, 108/2, 108/48, 108/136, 248/376, 297/332, 108/40
[51] Int. Cl. ...............................................A47b 3/00
[58] Field of Search..........108/2, 48, 37, 38, 40, 134, 108/136; 248/376; 297/332; 312/313

[56] References Cited

UNITED STATES PATENTS

| | | | |
|---|---|---|---|
| 916,763 | 3/1909 | McKee | 312/313 X |
| 1,655,516 | 1/1928 | Simpson | 108/38 X |
| 2,619,395 | 11/1952 | Kent | 108/38 |
| 3,161,159 | 12/1964 | Kritske | 108/136 X |

Primary Examiner—James C. Mitchell
Attorney—Laubscher & Sixby and Lawrence E. Laubscher

[57] ABSTRACT

The invention provides a foldable platform device comprising a platform having an end for linear guidance by a guideway between an out-of-use position of the platform and an in-use position of the platform, a guideway for so guiding said platform end, a support member for the platform which support member will extend between the platform and a platform support and will move with the platform between the platform out-of-use and in-use positions, and biasing means operatively connected to the support member for having a controlling influence over movement of the platform between its out-of-use and in-use positions.

17 Claims, 35 Drawing Figures

INVENTOR
BERTRAM R. HOLDHAM
BY Lawrence E. Laubscher
ATTORNEY

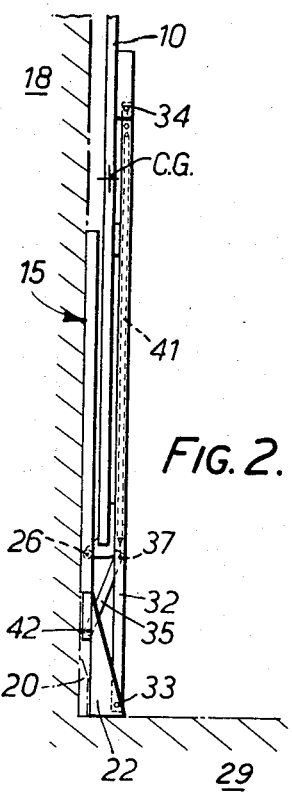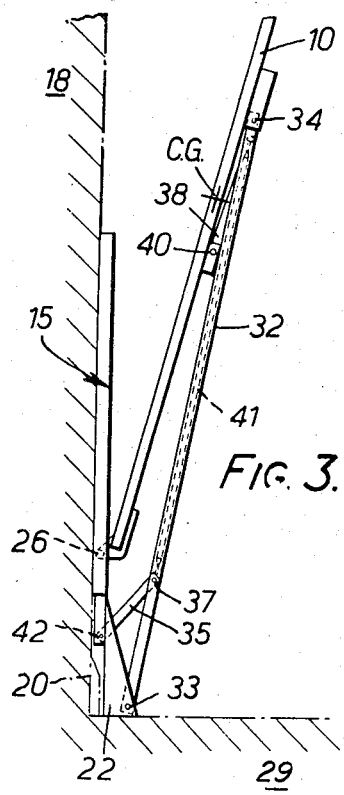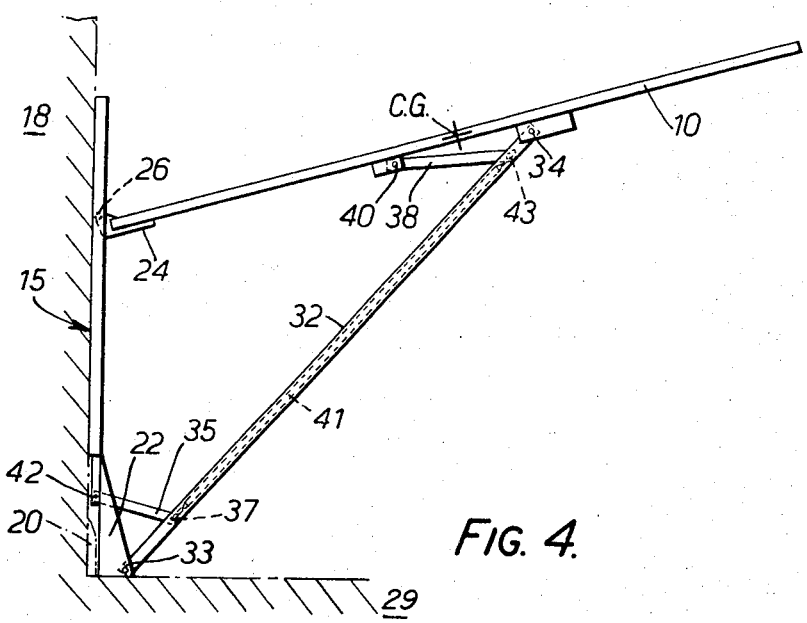

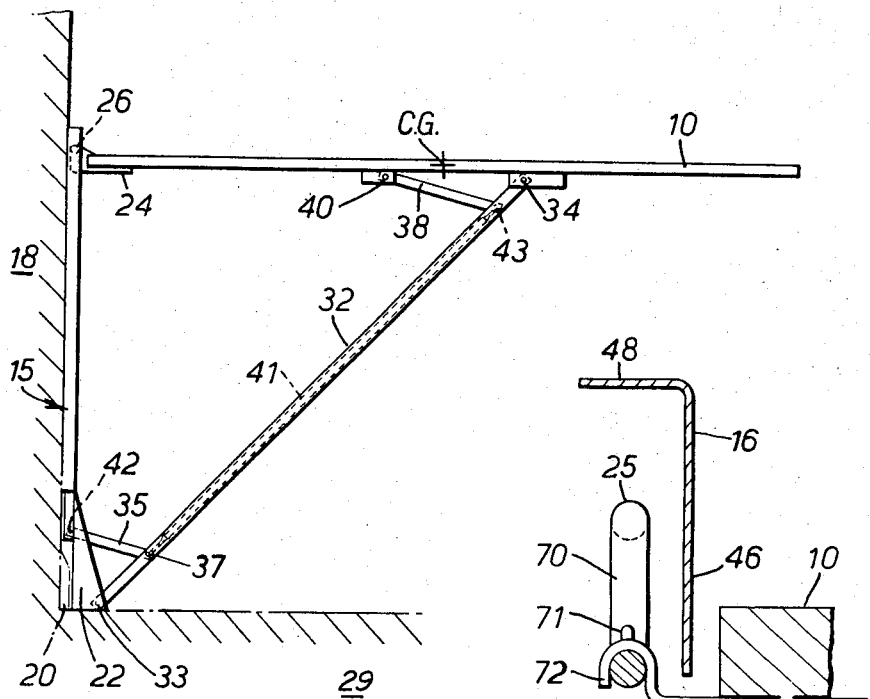
FIG. 5.
FIG. 9.
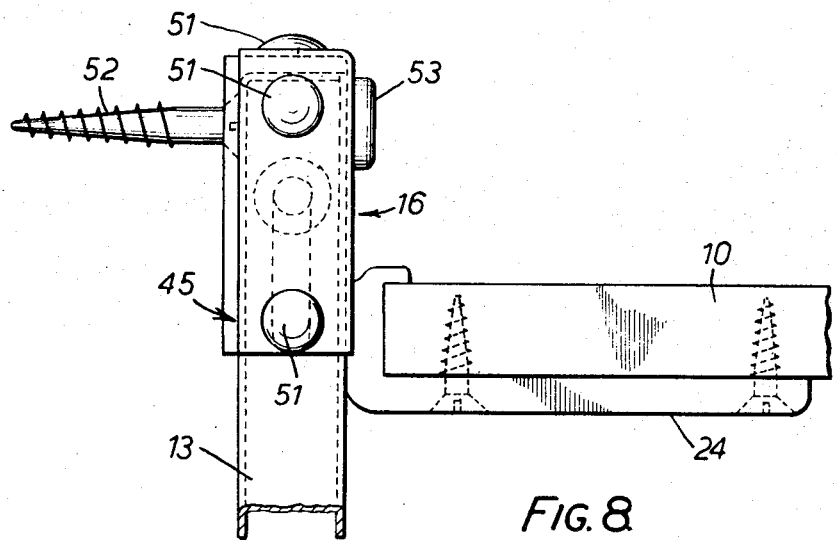
FIG. 8.

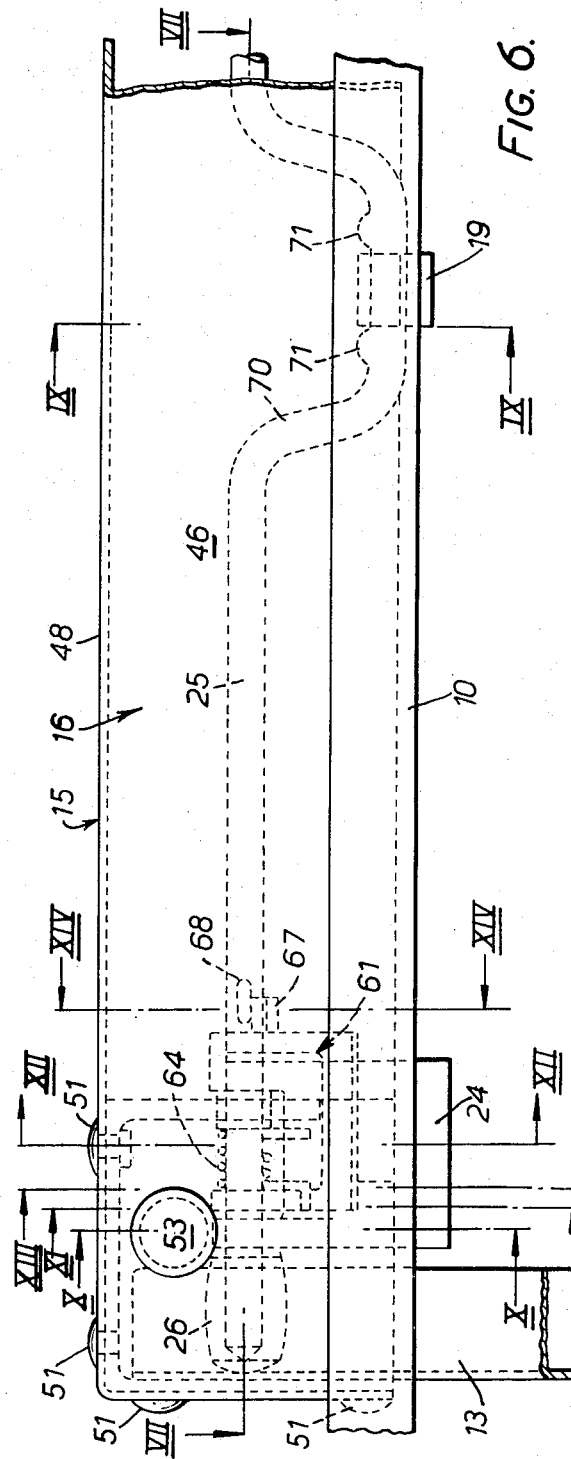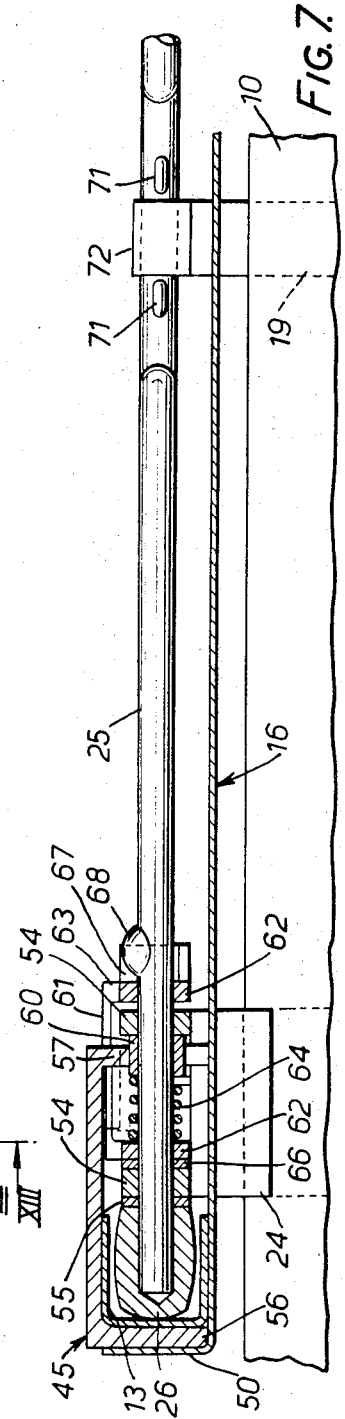

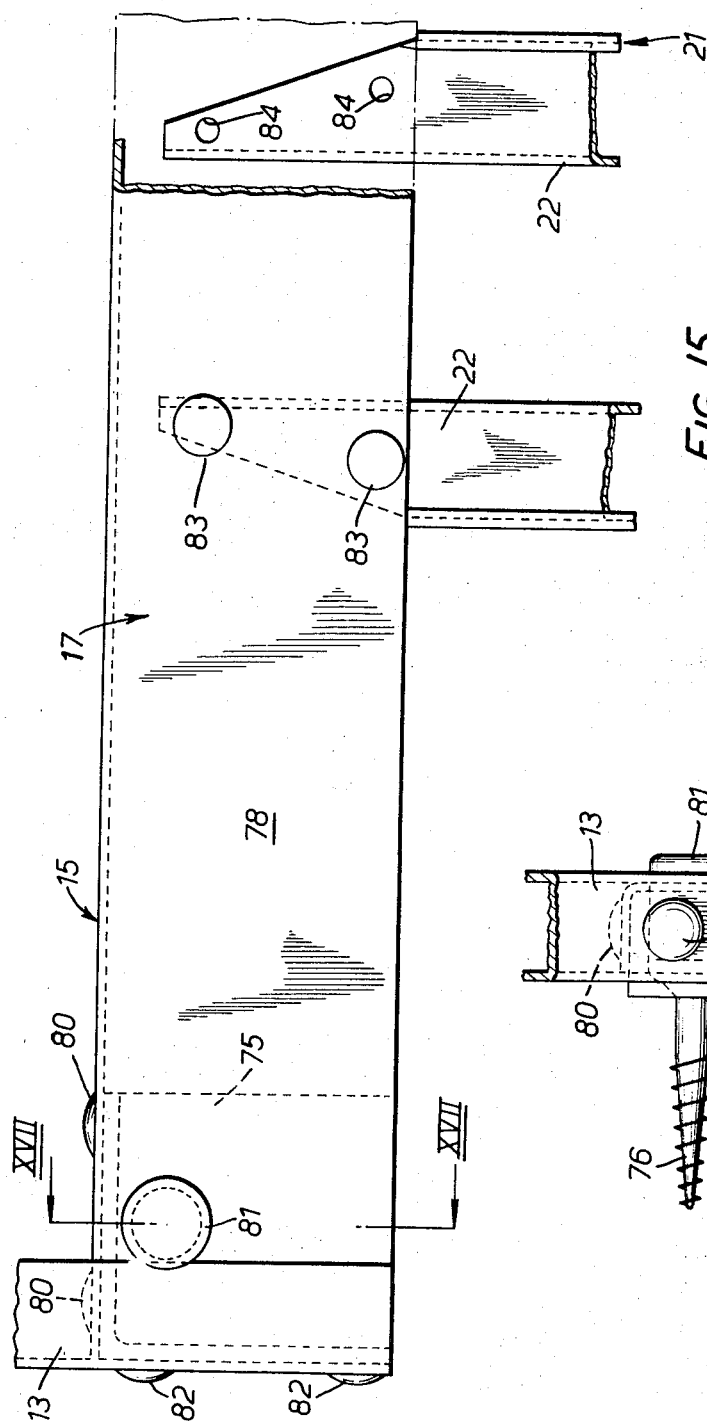
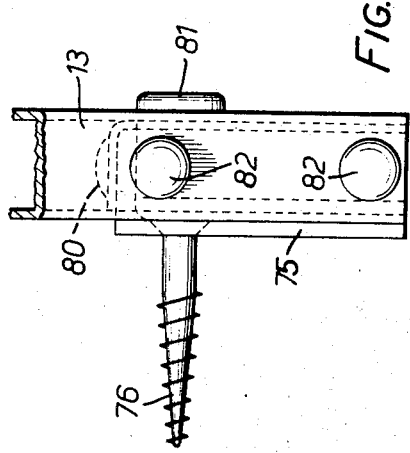

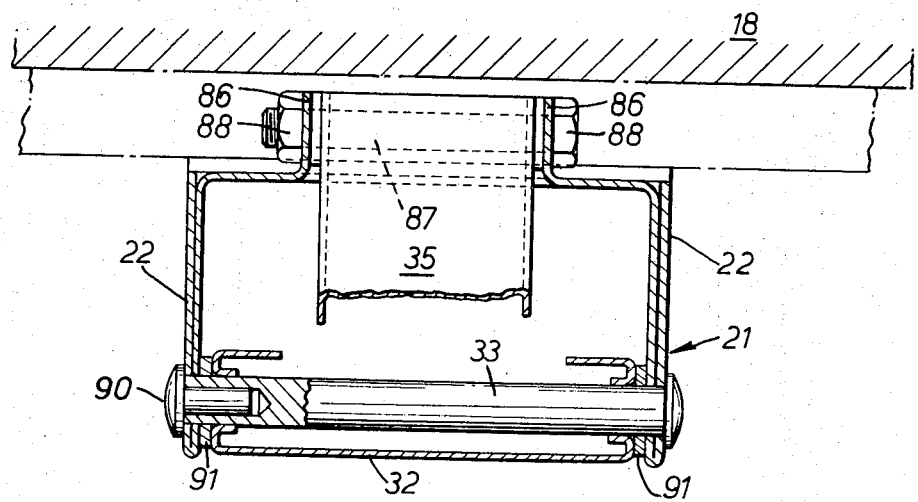
FIG. 19.
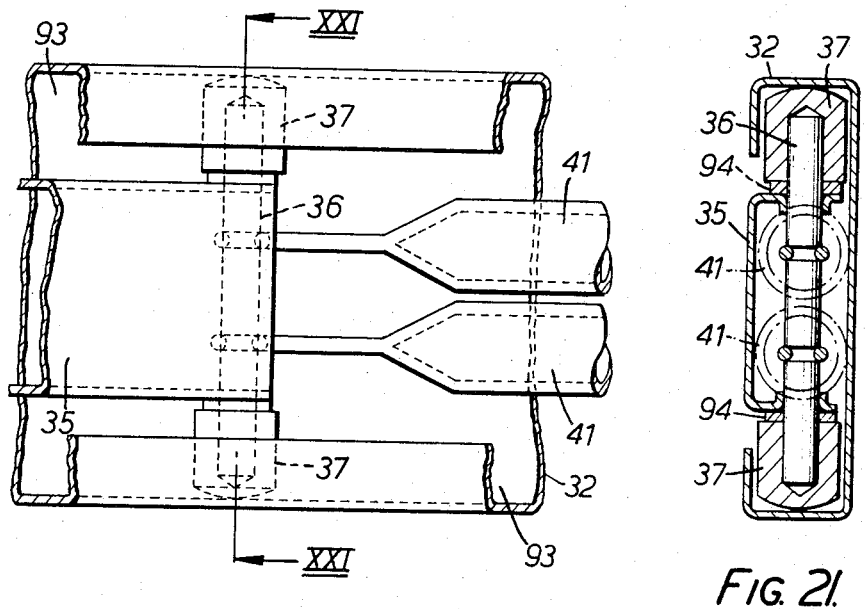
FIG. 20.
FIG. 21.
INVENTOR
BERTRAM R. HOLDHAM
BY Lawrence E. Laubscher
ATTORNEY

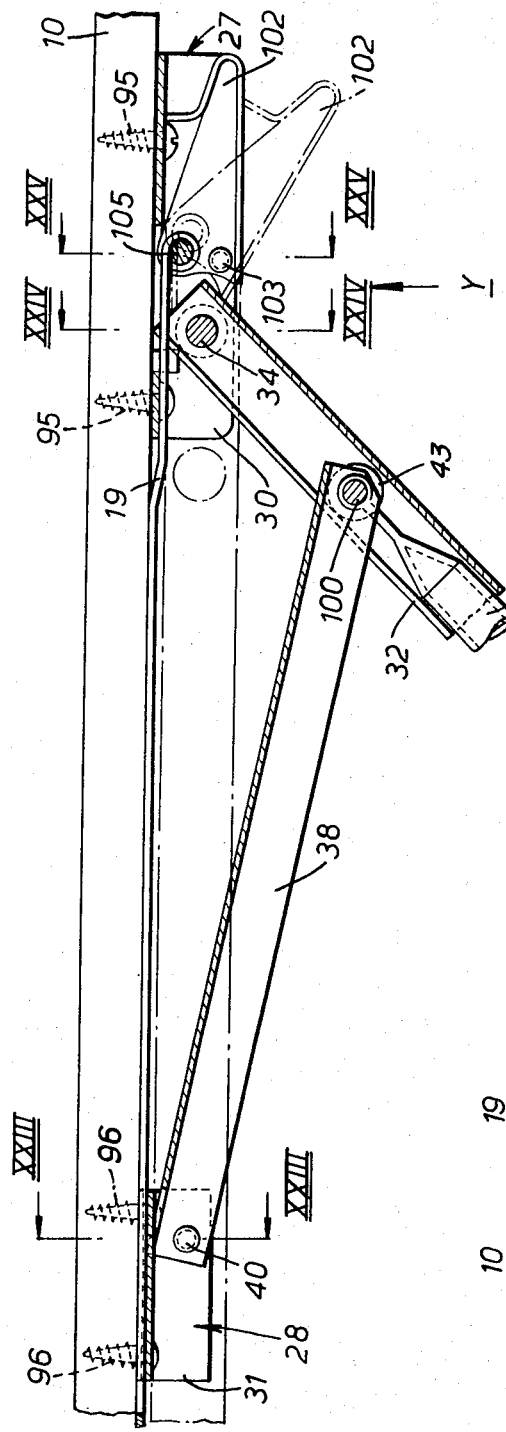
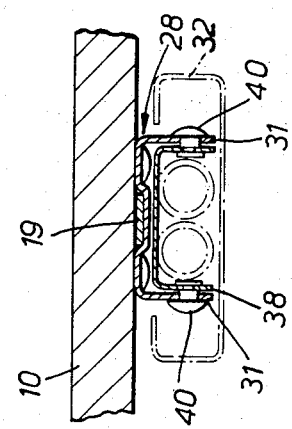
FIG. 22.
FIG. 23.
INVENTOR
BERTRAM R HOLDHAM
BY Lawrence E. Laubscher
ATTORNEY

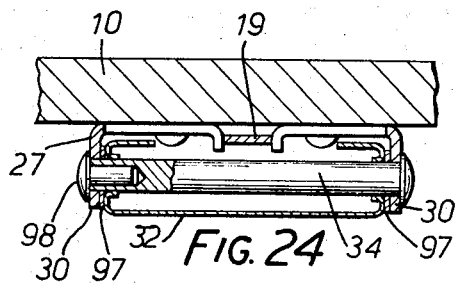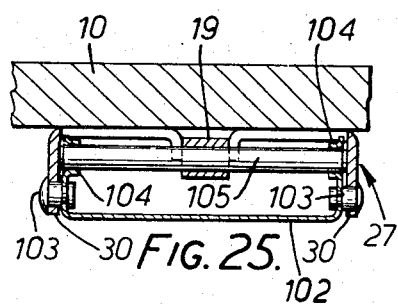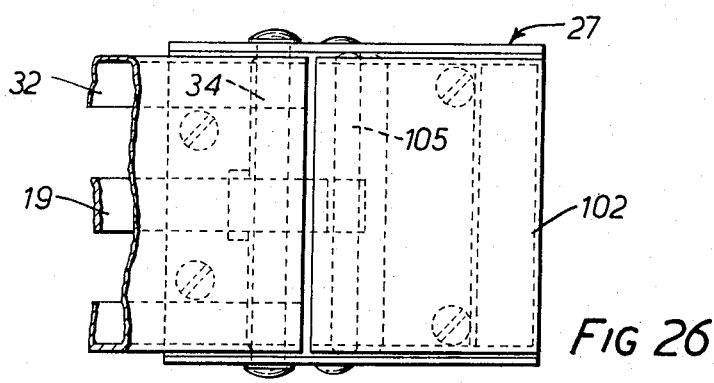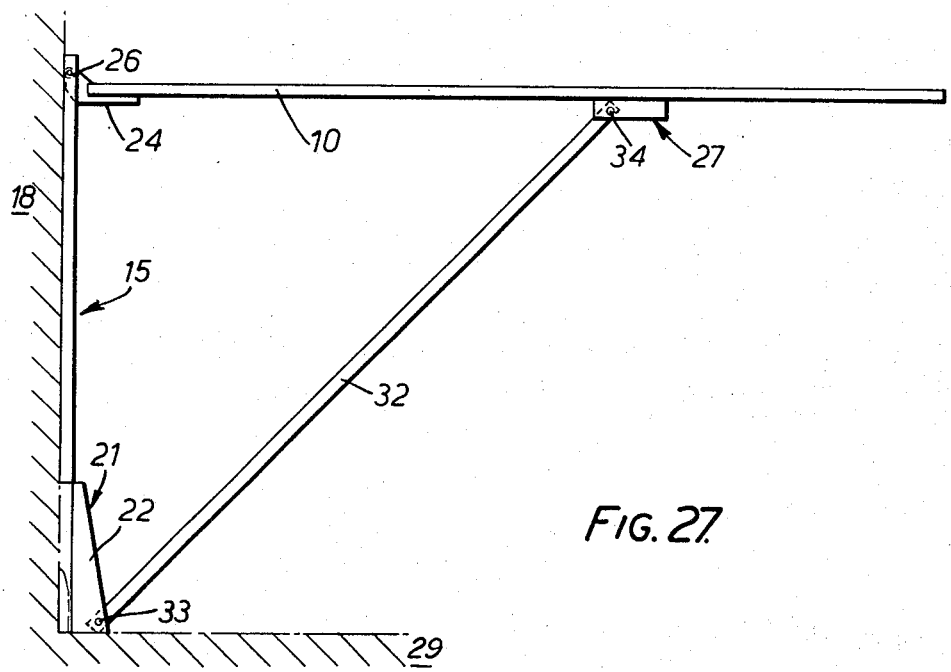

Inventor:
BERTRAM R. HOLDHAM
By: Lawrence E. Laubscher
Attorney

FOLDABLE PLATFORM DEVICE

This invention relates to a foldable platform device. The platform of the device can, for example, constitute a table, bench, desk, ironing board or any other type or article where, in use, a horizontal or near horizontal surface is required.

The device of the present invention could, for example, be used in domestic houses and flats, restaurants, hotels, canteens, schools, and colleges, clubs, beach-huts, boats and ships, workshops, caravans and railways. When not in use, the platform of the device of the invention can be folded to a vertical plane and almost flush against a wall or other support and thereby occupy very little space. When the platform is required for use, it can be easily lowered to a horizontal or near horizontal position.

According to the present invention, there is provided a foldable platform device comprising a platform having an end for linear guidance by a guideway between an out-of-use position of the platform and an in-use position of the platform, a guideway for so guiding said platform end, a support member for the platform which support member will extend between the platform and a platform support and will move with the platform between the platform out-of-use and in-use positions, and biasing means operatively connected to the support member for having a controlling influence over movement of the platform between its out-of-use and in-use positions.

More specifically, the device of the invention has a guideway which comprises a frame assembly having slideways for guiding the rear end of the platform when it is being raised to a vertical out-of-use position and lowered to a horizontal, or near horizontal, in-use position. One or more members, supports, or support, the front end of the platform when it is lowered and the whole of the platform when it is raised. The frame assembly is secured to a wall or other support by means of fixing screws.

The biasing means of various embodiments of the invention comprises either a spring and lever system or a spring system. By varying the length, or lengths, and the position, or positions, of the lever, or levers, and by varying the spring rating, it is possible to cause the biasing means to operate in any one of the following ways, or in any way which is a possible combination of two or more of the following ways:

1. The biasing means may operate to resist movement of the platform away from its out-of-use position by biasing the platform towards its out-of-use position either during the whole of the platform movement between its out-of-use position and its in-use position or during a part only of that movement.

2. The biasing means may operate to bias the platform towards its in-use position either during the whole of the platform movement between its out-of-use position and its in-use position or during a part only of that movement.

3. The biasing means may so act against the weight of the platform and resist its movement away from its out-of-use position that the platform is effectively balanced during movement between a first position after its out-of-use position and a second position before its in-use position.

4. The biasing means may so act against the weight of the platform and resist its movement away from its out-of-use position that the platform is effectively balanced during the whole of its movement between its out-of-use position and its in-use position.

In use, the platform center of gravity has to be raised to bring the platform horizontal from a near horizontal position. Biasing means operating according to (2) above exerts the necessary effort to raise the rear end of the platform to bring the platform horizontal.

When the platform is in the horizontal position, the rear end is positively located thus providing rigidity; also, the rear end is locked by catches which prevent the platform from being raised until these catches have been released. A lever, or button device, is incorporated on the underside of the platform and, when operated, releases the aforementioned catches.

The present invention will be more readily understood from the following description, given by way of example only, of a number of embodiments thereof reference being made to the accompanying drawings in which:

FIGS. 2 to 5 show the device of FIG. 1 at various stages during movement of the platform from its raised, vertical, position to its lowered, horizontal position;

FIG. 6 is a view of an upper portion of the device of FIG. 1;

FIG. 7 is a sectional view on the line VII—VII of FIG. 6;

FIG. 8 is an end view on FIG. 6;

FIG. 9 is a sectional view on line IX—IX of FIG. 6;

FIG. 15 is a view of a lower portion of the device of FIG. 1;

FIG. 16 is an end view on FIG. 15;

FIG. 19 is a sectional view along broken line XIX—XIX of FIG. 18;

FIG. 20 is a view on arrow "X" of FIG. 18;

FIG. 21 is a sectional view on line XXI—XXI of FIG. 20;

FIG. 22 is a sectional side view of an upper portion of the device of FIG. 1;

FIG. 23 is a sectional view along line XXIII—XXIII of FIG. 22;

FIG. 24 is a sectional view along line XXIV—XXIV of FIG. 22;

FIG. 25 is a sectional view along line XXV—XXV of FIG. 22;

FIG. 26 is a view on arrow "Y" of FIG. 22;

FIG. 27 is a side view of a second embodiment of the invention;

Figure 1:
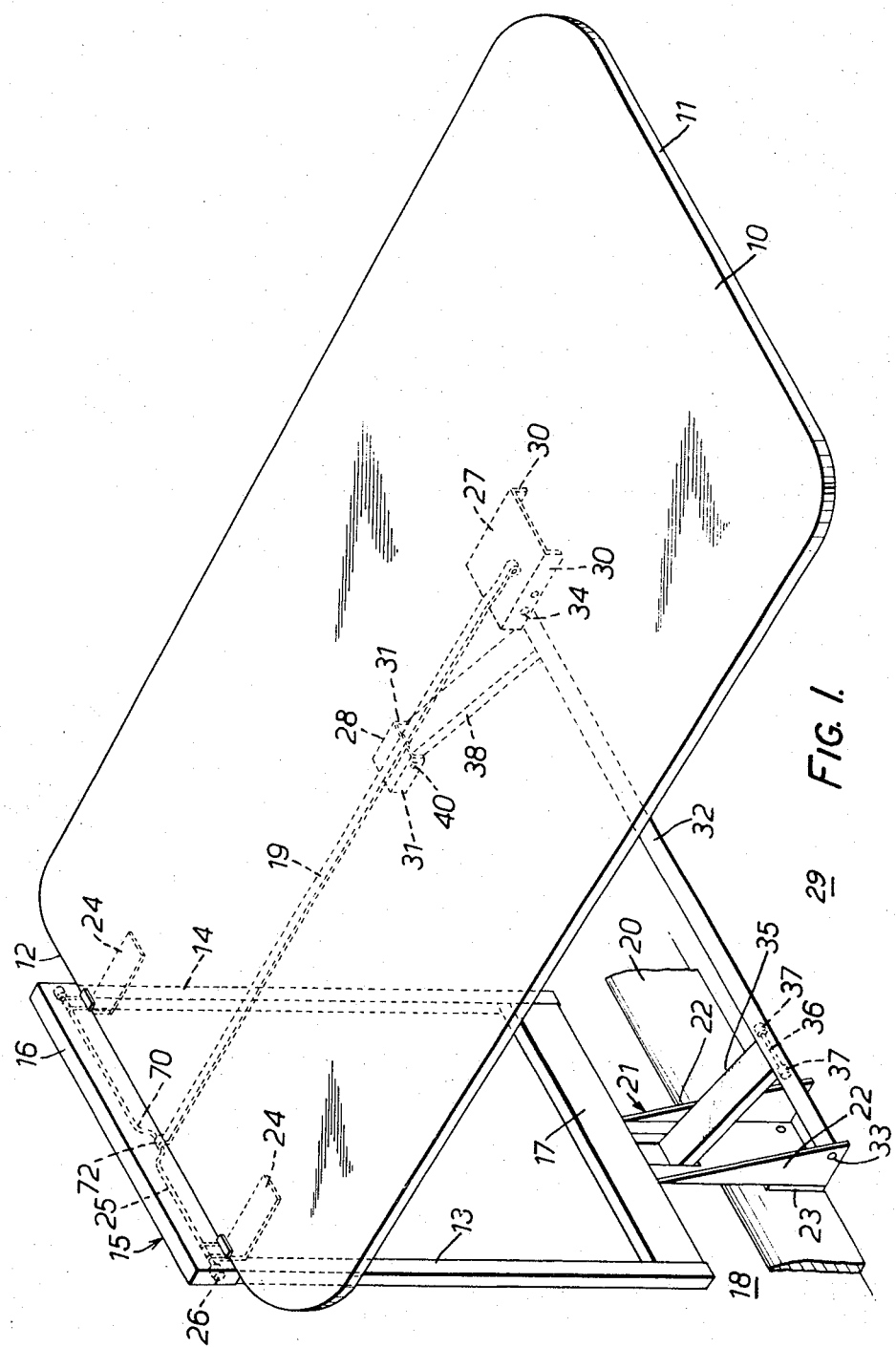
FIG. 1 is an isometric view of one embodiment of the device of the invention, the platform being shown in its lowered, horizontal, position.
Figure 10:
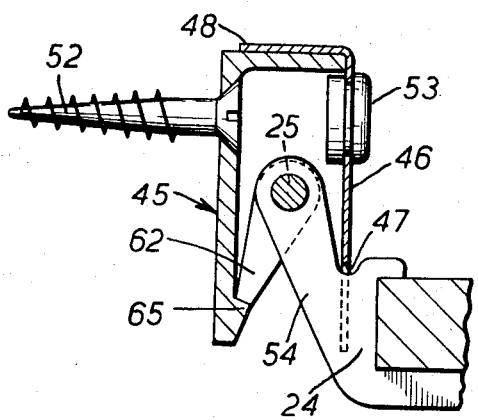
FIG. 10 is a sectional view on line X—X of FIG. 6.
Figure 11:
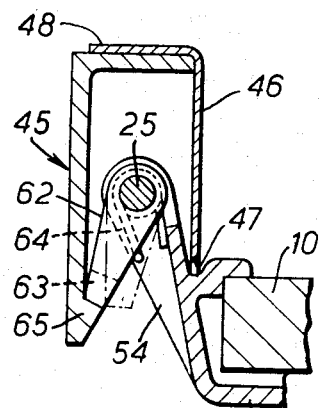
FIG. 11 is a sectional view on line XI—XI of FIG. 6.
Figure 12:
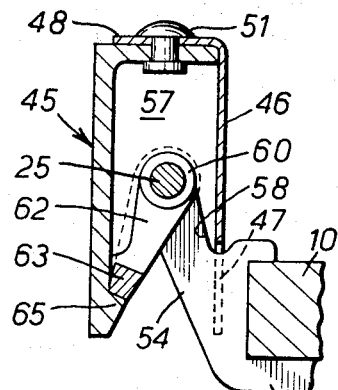
FIG. 12 is a sectional view on line XII—XII of FIG. 6.
Figure 13:
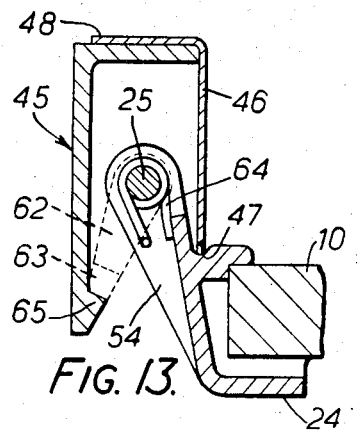
FIG. 13 is a sectional view on line XIII—XIII of FIG. 6.

The form of the invention shown in FIG. 1 comprises a platform 10 having a front end 11 and a rear end 12 which rear end can be guided linearly by slideways 13 and 14 of a platform support or frame assembly 15. Top and bottom cross-members 16 and 17 are connected to the slideways 13 and 14 to complete the frame assembly 15. As shown, the frame assembly 15 is secured to a wall 18 by means of fixing screws (not shown in FIG. 1). At the bottom of the wall 18 there is a normal skirting board 20. Beneath the frame assembly 15 is a further platform support or frame assembly 21 having brackets 22. The brackets 22 are secured to the bottom cross-member 17 by means of rivets (not shown in FIG. 1). The frame assembly 21 is secured to the skirting board 20 by means of screws. Between the frame assembly 21 and the skirting board 20 is a packing piece 23 which will accommodate variations in the thickness of, or the absence of, the skirting board 20.

To the rear end of the platform 10 are secured, by means of screws, two brackets 24 (see FIG. 8). These brackets rotatably receive a rod 25 which has a roller 26 rotatably mounted on each end thereof. In FIG. 1, there is shown a roller 26 rotatably mounted on the left hand end of the rod 25 as viewed in FIG. 1. The rollers 26 engage the slideways 13 and 14 and are guided thereby during upward and downward linear movement of the rear end 12 of the platform 10. A catch assembly to be described hereinafter holds the platform in its in-use or operative position, the platform 10 being shown in this position in FIG. 1. The catch assembly includes a bar 19 which engages the rod 25 as will be more fully explained hereinafter.

To the underside of the platform 10 are secured two mountings 27 and 28 having downwardly extending brackets 30 and 31 respectively. A strut 32 extends between the brackets 22 and 30 and is pivotally connected thereto by means of shafts 33 and 34 respectively. The shafts 33 and 34 are connected between the brackets 22 and 30 respectively and the ends of the strut 32 are rotatably mounted on the shafts 33 and 34 so that these shafts act as fulcrums for the strut 32.

Between the frame assembly 21 and the strut 32 is a lever 35. One end of the lever 35 is pivotally connected to the frame assembly 21 in the manner to be described. The other end of the lever 35 carries a rod 36. Rollers 37 are rotatably mounted on the rod 36 at each end thereof. The rollers 37 run in the strut 32 which provides a slideway therefor.

A further lever 38 extends between the mounting 28 and the strut 32. One end of lever 38 is pivotally secured to the brackets 31 by means of pivot pins 40 secured to the brackets 31. The other end of lever 38, like said other end of the lever 35, carries a rod having rollers rotatably mounted on its ends, the rollers being received in the strut 32 in the same manner as the rollers 37 of lever 35. Two springs in side-by-side relationship are connected to the rods at said other ends of the levers 35 and 38. These springs are not shown in FIG. 1 but are shown in FIGS. 2 to 5 and are referenced 41 in these Figures.

Attention will now be paid to FIGS. 2 to 5 which show the device of the invention at various stages during movement of the platform 10 from its out-of-use position shown in FIG. 2 to its in-use position shown in FIG. 5. In FIGS. 2 to 5, reference 42 indicates a shaft by means of which the said one end of lever 35 is pivotally connected to the frame assembly 21. Reference 43 indicates one of the said rollers at the end of lever 38. The device is shown as being connected between wall 18 and a floor 29.

FIG. 2 shows the platform 10 in its out of use and vertical storage position in which it will be retained by the springs 41 and levers 35 and 38. In the position shown in FIG. 2, the springs 41 will be in a stretched condition whereby the platform 10 will be urged towards its vertical position. It is to be noted that in the storage position the center of gravity (indicated by the letters C.G.) of the platform 10 lies to the left of the location of the shaft 33; this is true in all embodiments of the invention. Such an arrangement ensures that the weight of the platform is effective to urge it towards its vertical position. FIG. 3 shows the platform 10 partially displaced from its vertical position. In going from the position shown in FIG. 2 to the position shown in FIG. 3, the springs 41 are stretched. The spring and lever arrangement is such that, if the platform were released from its FIG. 3 position, the spring and lever arrangement would cause the platform to return to its vertical position. The platform 10 will, however, be balanced if it is lowered further until the stage is reached as shown in FIG. 4. FIG. 4 shows the platform 10 in a near horizontal position; further stretching of the springs 41 takes place during movement from the FIG. 3 position to the FIG. 4 position. After the platform 10 has reached the FIG. 4 position, an effort is required to raise its center of gravity to bring it horizontal. This effort is achieved by the spring and lever arrangement and the effort is brought about by relief of the tension in the springs 41. FIG. 5 shows the platform 10 in its horizontal position and at this stage the rear end will be positively located and locked to the support frame 15 whereby movement in any plane is prevented and rigidity is provided to the platform 10.

FIG. 6 to 14 show in detail the top left hand side of the frame assembly 15 as viewed in FIG. 1. The top right hand side of the frame assembly 15 is identical to the top left hand side and will accordingly not be described. The slideway 13 previously referred to is shown as being of channel section, the roller 26 being received in the channel for movement up and down the slideway 13. The top end of the slideway 13 is connected to a member 45 which is secured to the wall 18. The top cross-member 16 is of "L"-shaped cross section and provides a downwardly extending curtain 46 having notches 47 (see FIGS. 10 to 13) for receiving the brackets 24 when the platform 10 is in its horizontal position. The cross-member 16 has top and end flanges 48 and 50 respectively which are secured to the member 45 by way of rivets 51. As has been mentioned, the member 45 is secured to the wall 18 by means of screws and such a screw is shown at 52 in FIG. 10. The curtain 46 is provided with access holes for the screws 52 and these holes are plugged by means of buttons, (see button 53 in FIG. 10). The buttons are preferably made of a resilient material and will provide resilient stops for the platform 10 when it is in its vertical position.

It has been said that the rod 25 is rotatably mounted on the brackets 24. For this purpose, each bracket 24 is provided with a pair of arms 54 which rotatably receive the rod 25. With reference to FIG. 7, it is seen that a packing washer 55 is located between the roller 26 and the arm 54 to ensure that the roller 26 is located positively in the slideway 13 and that side movement of the roller 26 is prevented.

As shown particularly in FIG. 7, the member 45 has side flanges 56 and 57. The side flange 56 is secured to the flange 50 of the cross-member 16. The flange 57 of member 45 has a recess 58 formed therein (see FIG. 12) for the reception of rod 25 when the platform 10 is in its horizontal position. As is seen in FIG. 7, there is a roller 60 which is free to rotate on rod 25 and which will engage the wall of the recess 58. The roller 60 abuts the right hand arm of bracket 24 as viewed in FIG. 7.

Catch assemblies are effective to hold the platform 10 in its horizontal position. There are two identical catch assemblies, one adjacent each end of the rod 25. One such catch assembly will now be described together with the means for releasing the assembly from its platform holding position whereby the platform can be moved from its horizontal position to its vertical position. The catch assembly comprises a locking catch 61 having arms 62 and a cross bar 63 interconnecting the arms 62. The arms 62 are rotatably mounted on the rod 25. Between the roller 60 and the arm 62 of locking catch 61, there is a torsion spring 64 which is mounted on the rod 25 (see FIG. 7). One end of the spring 64 bears on bracket 24 while the other end bears on the locking catch. The spring 64 urges the locking catch 61 towards the member 45. The member 45 has a projection 65 and when the platform 10 is brought to its horizontal position, the bar 63 of the locking catch 61 is snapped over the projection 65 by the action of the spring 64. The platform 10 is thus held in its horizontal position.

With reference to FIG. 7, it is to be noted that between the arm 54 of bracket 24 and the arm 62 of locking catch 61, there is a packing washer 66.

Figure 14:
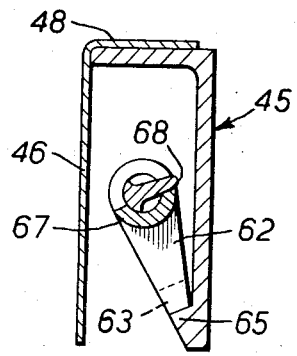
FIG. 14 is a sectional view on line XIV—XIV of FIG. 6.

Turning to FIGS. 6, 7 and 14, the locking catch 61 has a projection 67 extending outwardly from one of the arms 62 of the locking catch 61 towards the center of the rod 25. The projection 67 is arranged to be engaged by a swaged lip 68 on rod 25. Alternatively, the rod 25 could carry a pin to engage the projection 67. In order to disengage the bar 63 of locking catch 61 from the projection 65 on member 45, the rod 25 is rotated in a clockwise direction as viewed in FIG. 14. Such rotation of the rod 25 forces the swaged lip 68 against the projection 67 on locking catch 61 and the locking catch 61 is therefore forced off the projection 65. With the locking catch 61 disengaged from the member 45, the rear end of the platform 10 can be lowered thereby enabling the platform to be moved to its vertical position.

There will now be described the means by which the rod 25 is caused to rotate to move the locking catch 61 from off the projection 65. Turning to FIGS. 6, 7 and 9, it is seen that the rod 25 is formed with a downwardly extending bend 70 intermediate its ends. At the bottom of this bend are two projections 71 between which is located an inverted "U"-shaped portion of the bar 19 previously referred to with respect to FIG. 1. It will be appreciated that linear displacement of the bar 19 (by means to be described) will cause rotation of the rod 25.

It will be appreciated from the foregoing that when the platform 10 is in its horizontal position, the rear end of the platform will be prevented from moving in any direction and the platform will be rigidly secured in its horizontal position. It will be appreciated that the roller 60 engaging the wall of the recess 58 positively locates the platform in its horizontal position.

Figure 17:
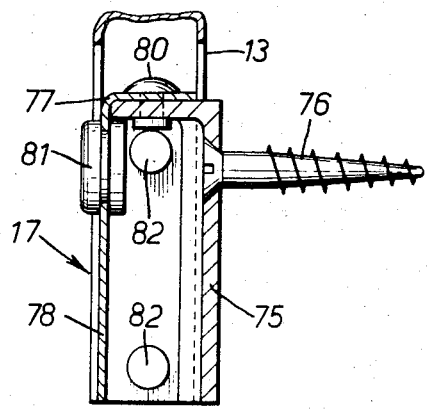
FIG. 17 is a sectional view on line XVII—XVII of FIG. 15.
Figure 18:
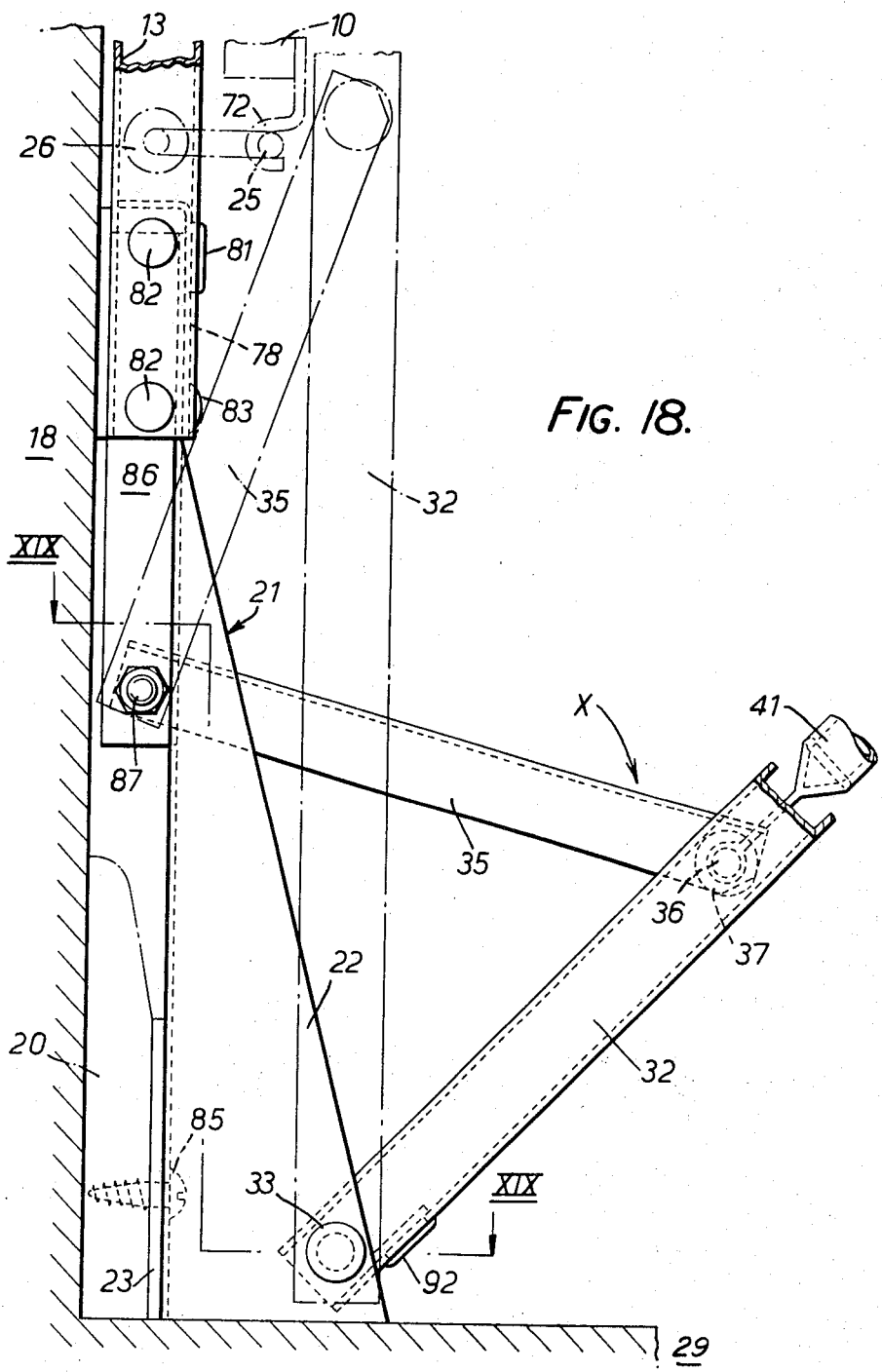
FIG. 18 is a side view of the lower part of FIG. 1.

FIGS. 15 to 17 show detail at the bottom of the frame assembly 15 and the manner of connection between this frame assembly and the frame assembly 21. The detail at the bottom left hand end of frame assembly 15 is the same as that at the bottom right hand end of this assembly and accordingly only the detail at the bottom left hand end will be described.

At the bottom left hand corner of frame assembly 15 is a member 75 which is secured to the wall 18 by means of a screw 76. The cross-member 17 has an upper flange 77 and a downwardly extending curtain 78. The flange 77 is secured to the member 75 by way of rivets 80. The curtain 78 has an access hole for the screw 76 and this hole is covered by button 81. The slideway 13 is secured to the member 75 by way of rivets 82.

FIG. 15 shows the frame assembly 21 connected to the curtain 78 of cross-member 17 by way of rivets 83 located in holes 84.

Attention will now be paid to FIGS. 18 to 21 which show in greater detail the lower part of the device illustrated in FIG. 1. The frame assembly 21 is secured to the skirting board 20 by means of screws, such a screw being shown at 85 in FIG. 18. It has been mentioned that the lever 35 is pivotally connected to the frame assembly 21. For this purpose, the frame assembly 21 has inwardly directed flange portions 86 which are spanned by shaft 87 in the form of a bolt or pin. The shaft 87 is held in place by nuts 88. The lever 35 is of channel shaped cross section and it is the flanges of the lever 35 which rotatably receive the shaft 87.

The strut 32 is also of channel shaped cross section and it is the flanges of this strut which rotatably receive the shaft 33 which is in the form of a pin and which extends between the brackets 22 of the frame assembly 21. The shaft 33 may be retained in its position by a spiral drive rivet 90. Packing washers 91 provide clearances between strut 32 and brackets 22. Adjacent the bottom thereof, the strut 32 has an access hole for screw 85, the access hole being filled, after use, by button 92 which may be of resilient material.

It has already been mentioned that the lever 35 has a shaft 36 at the end thereof which shaft 36 carries rollers 37. This structure is clearly seen in FIG. 20 which shows the shaft 36 rotatably received by the side flanges of lever 35. The rollers 37 are rotatably mounted on the ends of the shaft 36 and these rollers are received in guideways 93 formed in strut 32. The rollers 37 can thus run up and down strut 32. With reference to FIG. 21, packing washers 94 are located between the side flanges of lever 35 and rollers 37. These packing washers will prevent excess side movement and, therefore, afford a certain amount of stabilizing effect as the platform 10 is lowered to its horizontal position. Mention has previously been made of the two springs 41 in side-by-side relationship and these springs are shown in FIGS. 20 and 21 attached to shaft 36.

Attention will now be paid to the upper portion of the device shown in FIG. 1, reference being made to FIGS. 22 to 26.

Turning to FIG. 22, the mountings 27 and 28 previously referred to are shown secured to the underside of platform 10 by means of screws 95 and 96 respectively. Between the side flanges 30 of mounting 27 and secured thereto is the shaft 34 previously referred to. The shaft 34 is rotatably received by the strut 32. Packing washers 97 are located between the side flanges 30 and the strut 32. The shaft 34 which may be in the form of a pin may be retained in position by a spiral drive rivet 98 (see FIG. 24).

Turning to FIG. 23, there is shown the pivotal connection between the lever 38 and the side flanges 31 of mounting 28. This pivotal connection, comprises pivot pins 40 which allow the lever 38 to pivot relatively to the mounting 28.

It will be noted that the lever 38 is of channel shape cross section and at its end opposite to that end having the pivot pins 40, there is a shaft 100 which is rotatably received by the side flanges of lever 38. The shaft 100 extends from the side flanges of lever 38 in the same manner as shaft 36 extends from the side flanges of lever 35. As in the case of shaft 36, rollers are rotatably mounted on the ends of shaft 100. These rollers are shown at 43 in FIG. 22 and are received in the guideways 93 of strut 32 so that these rollers 43 can ride up and down the strut 32. As will be appreciated, the roller assembly on lever 38 is identical with that on lever 35. The two springs 41 are attached to the shaft 100 in the same way as these springs are attached to the shaft 36 of lever 35.

Mention has already been made of linear displacement of the bar 19 in order to release the catch mechanism which is effective to hold the platform 10 in its horizontal position. The means for achieving the linear displacement of the bar 19 will now be described with reference to FIGS. 22, 25 and 26. Located between the side flanges 30 of bracket 27, is a lever 102. This lever is pivotally mounted on the side flanges 30 by way of pins 103 which are secured to the side flanges 30. Secured to the lever 102 and extending between side flanges 104 thereof is a pin 105 to which the bar 19 is attached. The catch 61 is released by rotating the lever 102 from its full line position shown in FIG. 22 to its chain dotted line position shown in that Figure. An alternative, and more simple, arrangement would be to attach a knob to the end of bar 19 which bar, when pulled, would release the catch 61.

It will be noted from FIGS. 23, 24 and 25 that the bases of the brackets 27 and 28 are adapted to receive the bar 19 so that this bar can be freely displaced linearly with respect to these brackets.

When the platform 10 is in its vertical position, a force is exerted on the free end of the lower lever 35 by tension in the springs 41 (the top ends of which are attached to the lever 38) producing a turning moment on lever 35 about its fulcrum shaft 87. The geometry of the device is such that a turning moment is subsequently generated on strut 32 about its fulcrum shaft 33. As the top of strut 32 is attached to the platform 10, the strut 32 will retain the platform in its vertical position. When the platform 10, and hence the strut 32, is displaced, the free end of lever 35 will descend strut 32 and in the process extend the springs 41 causing a turning moment on strut 32 resulting from tension in the springs 41 and the mechanical advantage of lever 35. This will tend to force the platform 10 towards its vertical position. The weight of the platform 10 itself will generate a turning moment about the shaft fulcrum 33 of strut 32 which, when the platform 10 is just beyond the vertical, will assist the turning moment produced by springs 41. However, when platform 10 is displaced to the stage where its center of gravity is on the opposite side of the shaft fulcrum 33, an opposing turning moment will be generated and a state of equilibrium will be reached when this latter moment equals that of the former and the platform 10 will effectively be balanced.

Further displacement of platform 10 will produce an increasing gravity turning moment, but further extension of the springs 41 will generate an increasing balancing moment. The geometry of the device is such that a state of near equilibrium will prevail until the platform is almost horizontal. At this stage, an effort is required to raise the center of gravity of the platform.

The effort to raise the platform's center of gravity is derived from the energy stored in the springs 41 due to their extension. As the platform 10 is displaced from its vertical position, the roller assembly on the end of the upper lever 38 will ascend strut 32 but the amount of displacement of this roller assembly and the angle of lever 38 with respect to the platform is small until the platform is near horizontal. At this stage, the lever 38 which is pivoting about its fulcrum 40 will exert sufficient force to enable the rear end of the platform 10 to rise into the horizontal plane where it will become locked by catch 61.

A second embodiment of the invention will now be described with reference to FIGS. 27 to 31 and a third embodiment will be described with reference to FIGS. 32 and 33. Like parts of the three embodiments have been given the same reference numerals. The rear ends of the platforms 10 of the second and third embodiments are guided vertically in frame assembly 15 as is the rear end of the platform 10 of the embodiment of FIGS. 1 to 26. The second and third embodiments are provided with catch assemblies as described with reference to the first embodiment.

Figure 28:
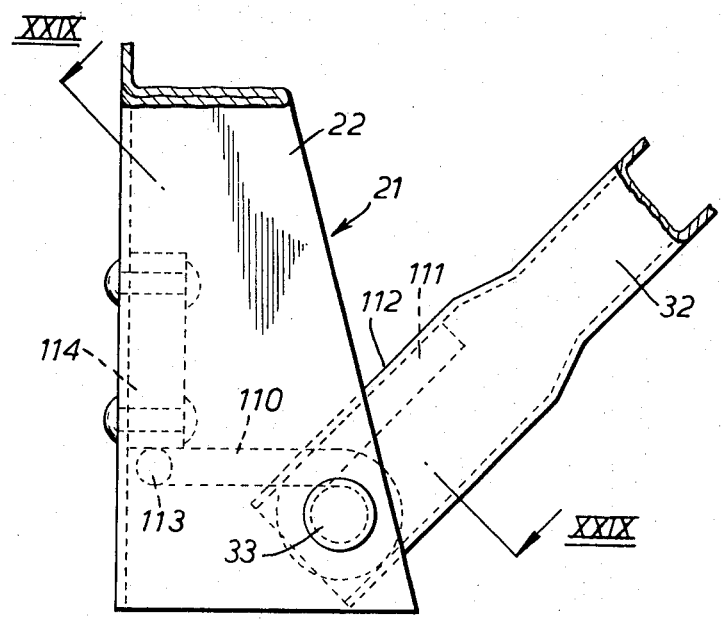
FIG. 28 is a side view of a lower portion of the embodiment of FIG. 27.
Figure 29:
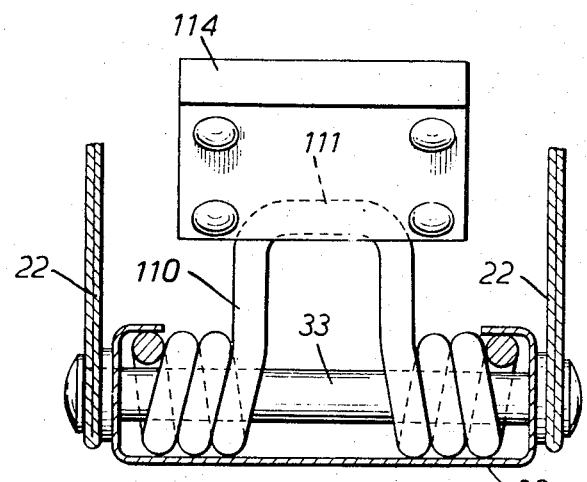
FIG. 29 is a sectional view on the line XXIX—XXIX of FIG. 28.

In the embodiment of FIGS. 27 to 31, torsion springs are assembled at the fulcrum points on strut 32, namely at the locations of the shafts 33 and 34. FIGS. 28 and 29 illustrate the structure at, and adjacent, the location of the torsion spring assembled on the shaft fulcrum 33. The torsion spring is shown at 110; one end 111 of spring 110 is anchored on flange 112 of strut 32 and the other end 113 of spring 110 bears on block 114 which is secured to frame assembly 21. The spring 110 will induce an anti-clockwise turning moment on strut 32 as viewed in FIG. 27 due to the pre-loading of spring 110. The spring 110 will retain the platform 10 and the strut 32 in their vertical positions. When these members are displaced from their vertical positions, the resistance in spring 110 will increase and this increase in resistance will counterbalance the weight of the platform 10.

Figure 30:
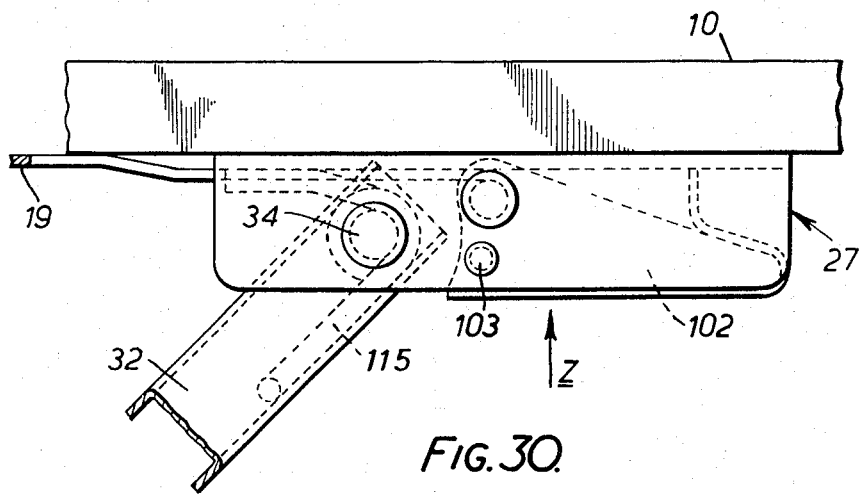
FIG. 30 is a side view of an upper portion of the embodiment of FIG. 27.
Figure 31:
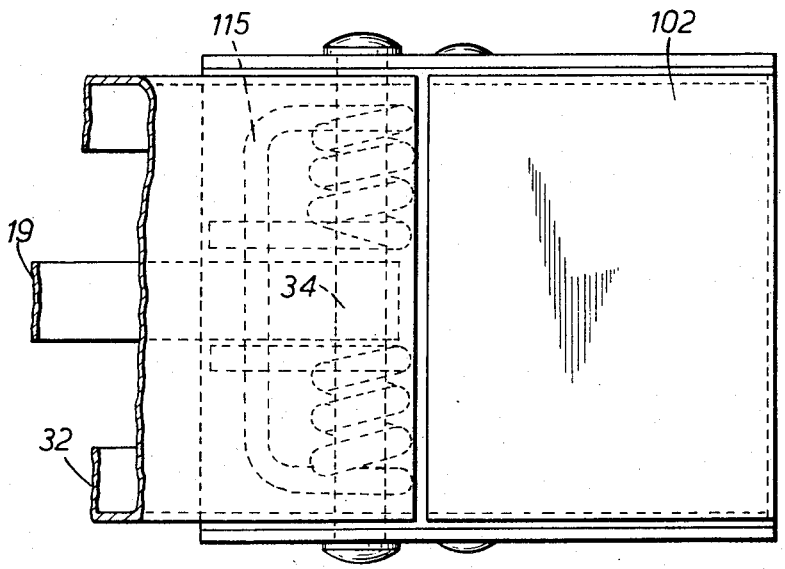
FIG. 31 is a view on arrow "Z" of FIG. 30.

FIGS. 30 and 31 show in detail the torsion spring 115 at the other end of strut 32. Torsion spring 115 is pre-loaded and reacts between strut 32 and platform 10 creating a turning moment about shaft fulcrum 34. The torsion spring 115 will cause the rear end of the platform 10 to be raised when it approaches the horizontal plane.

Figure 32:
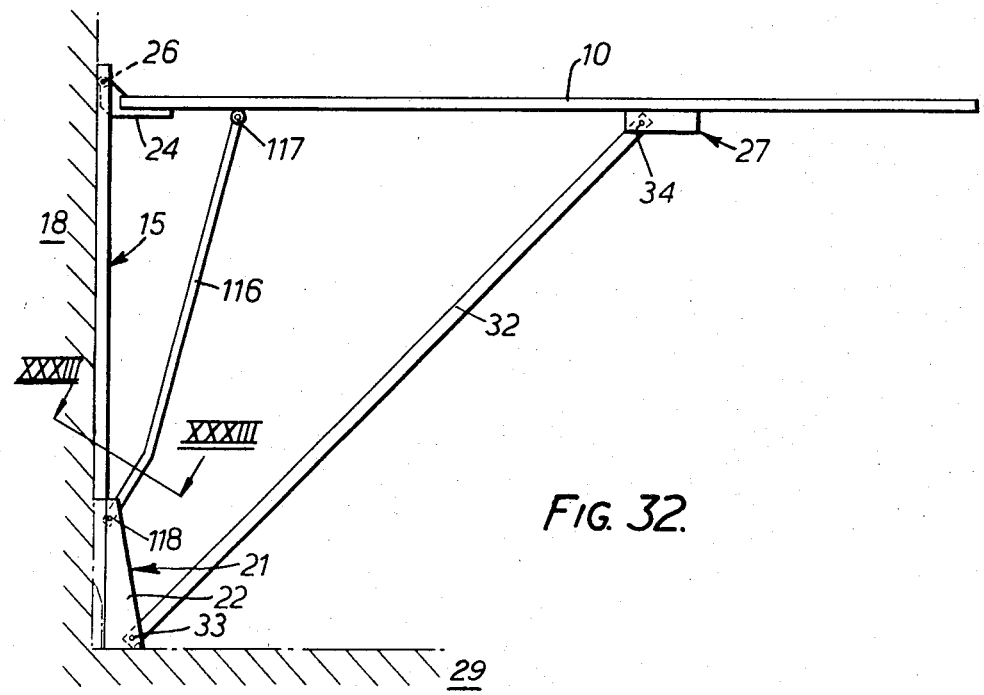
FIG. 32 is a side view of a third embodiment of the invention.
Figure 33:
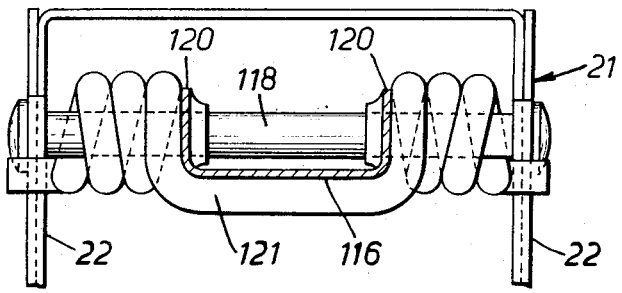
FIG. 33 is a sectional view on the line XXXIII—XXXIII of FIG. 32.

In the third embodiment shown in FIGS. 32 and 33, the weight of the platform 10 is counterbalanced by means of a lever 116. The top end of this lever rotatably carries a roller 117 for bearing against the underside of platform 10. The bottom end of lever 116 is pivoted to the frame assembly 21. This pivotal connection comprises a shaft or pin 118 extending between, and connected to, the side flanges 22 of frame assembly 21. The lever 116 has side flanges 120 which are pivotally mounted on the shaft 118. A torsion spring 121 bears on the back-side of lever 116 and is anchored to the frame assembly 21. The pre-loading of spring 121 will cause the lever 116 to exert, by way of roller 117, a force on the platform 10 such that when this platform is in its vertical position it will be retained there. When the platform 10 is displaced from its vertical position, the torsion spring 121 will counterbalance the weight of the platform until the stage is reached when the platform is nearly horizontal. At this stage, the spring 121 will serve to raise the rear-end of the platform.

Figure 34:
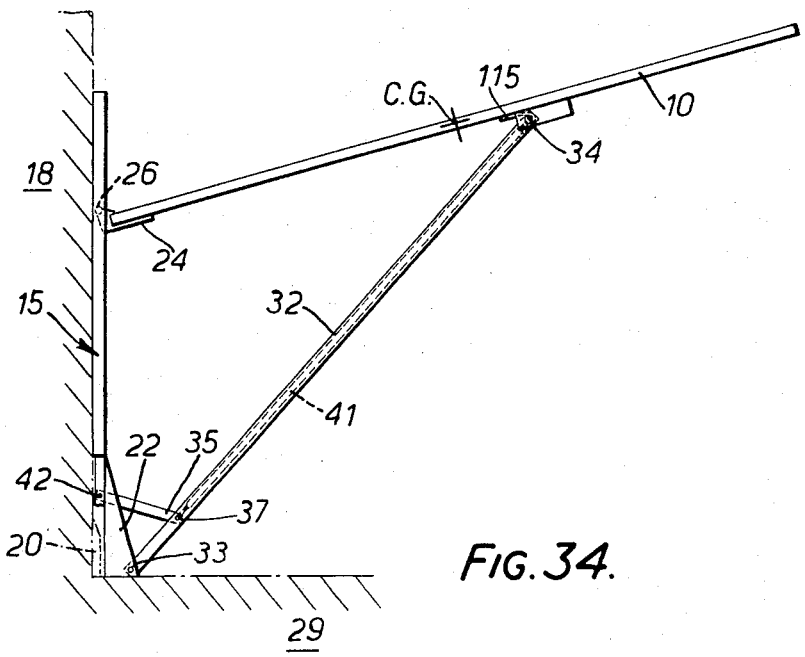
FIGS. 34 and 35 are two further embodiments of the invention.
Figure 35:
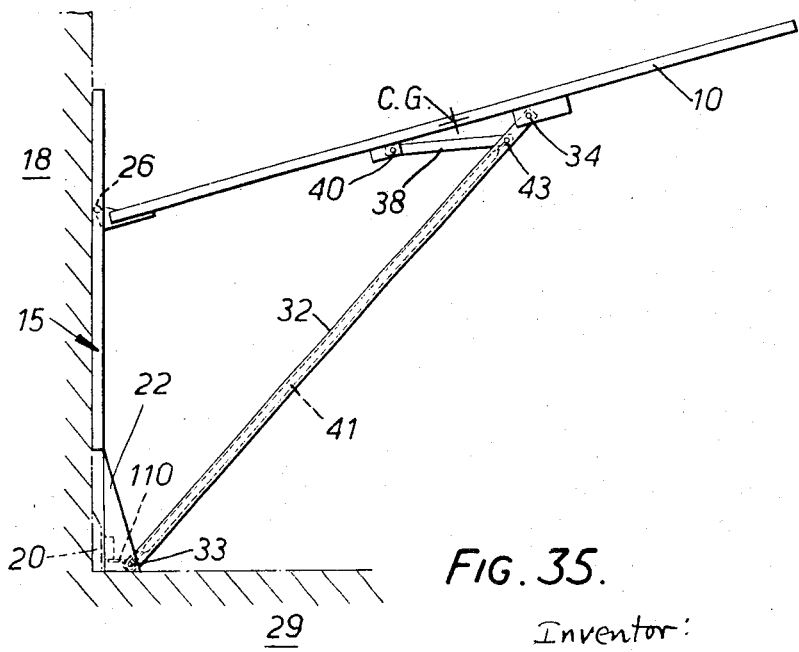

It will be appreciated that a combination of features from the three embodiments could be utilized. For example, yet another embodiment is possible which is a modification of the embodiment of FIGS. 1 to 26. Referring to FIG. 34, the top ends of the springs 41 are attached to the strut 32, the upper lever 38 being discarded. The top end of strut 32 is provided with the torsion spring arrangement 115 of FIG. 30. Alternatively, the bottom ends of the springs 41 could be attached to the strut 32 and the lower lever 35 discarded (FIG. 35). The bottom end of strut 32 could then be provided with the torsion spring arrangement as shown in FIG. 29.

Other embodiments are possible which are modifications of the embodiment shown in FIGS. 27 to 31. Thus one such modification may not include the torsion spring 110 but would include the torsion spring 115. Another modification is one in which the torsion spring 110 would be retained but in which the torsion spring 115 would not be retained.

The shape, size and weight of the platform 10, would to some extent, dictate the most suitable arrangement.

It will be appreciated that the provision of means biasing the platform 10 towards its vertical and out-of-use position ensures that the platform will not, of its own accord, come away from its vertical position. This is important as a matter of safety because if the platform did, itself, come away from its vertical position it could injure a child, for example.

The provision of means biasing the rear end of the platform 10 upwardly when the platform is in its horizontal position serves two purposes. Firstly, it assists in the raising of the center of gravity of the platform 10 during the final stage of its movement to its in-use position. Secondly, it co-operates with the catch mechanism to ensure that the platform is held firmly in its horizontal position when in use.

It is to be understood that sliding blocks may replace the rollers 26, 37, 43 and 117.

I claim:

1. Foldable platform means, comprising a platform normally having a horizontal operative position; fixed vertical slide means; means connecting one end of said platform for vertical sliding movement relative to said slide means; a fixed platform support arranged immediately beneath said slide means; a rigid strut member pivotally connected at one end with said fixed platform support, the other end of said strut member being pivotally connected with said platform adjacent its other end, said one platform end being downwardly slidable in said vertical slide means and said rigid strut member being upwardly pivotable about its lower end to permit said platform to be collapsed from said horizontal operative position to a vertical storage position adjacent and parallel with said slide means; and spring and lever means biasing said platform toward one of said operative and storage positions.

2. Apparatus as defined in claim 1, wherein said biasing means includes a lower lever pivotally connected at one end with said rigid platform support above the pivotal connection of the lower end of said strut member, an upper lever pivotally connected at one end with said platform between said one end thereof and the pivotal connection of the upper end of said strut member, means connecting the other ends of said levers for sliding movement relative to said strut member, and spring means biasing said other ends of said levers toward each other.

3. A device according to claim 2, wherein said other ends of the two levers each carry roller means, and further wherein the strut member carries slide means slidably receiving said roller means.

4. A device according to claim 1, wherein said biasing means biases said platform toward its vertical storage position.

5. A device according to claim 1, wherein said biasing means provides a counterbalance to the weight of the platform during platform movement between its storage and operative positions.

6. A device according to claim 1, wherein said biasing means biases said platform towards its horizontal operative position.

7. A device according to claim 1, including means for positively locating the platform in its horizontal operative position.

8. A device according to claim 1, including releasable catch means for releasably holding the platform in its horizontal operative position.

9. A device according to claim 1, wherein the center of gravity of the platform is so disposed relative to said pivotal connection between said strut member and said platform support that when the platform is in its vertical storage position the weight of the platform biases the platform towards its vertical storage position.

10. A device according to claim 1, wherein said one platform end carries roller means for reception by said slide means.

11. A device according to claim 1, and further including an additional lever pivotally connected at its lower end with said platform support, said additional lever being adapted at its upper end to bear against the under surface of said platform, said bearing means comprising a torsion spring urging said additional lever in the direction of said platform.

12. A device according to claim 11, wherein said additional lever includes at its upper end roller means for bearing against the underside of the platform.

13. A device according to claim 1, wherein said spring and lever biasing means includes a lever one end of which is pivotally connected with said platform support and the other end of which engages said strut member adjacent the platform support end thereof, and spring means interconnecting said other end of said lever and said strut member, said spring means being connected to said strut member at a location between said other end of said lever and said platform.

14. Apparatus as defined in claim 13, wherein said biasing means further includes torsion spring means arranged at the platform end of said strut member for urging said platform toward its horizontal operative position, said other end of said lever being guided for movement along said strut member.

15. Apparatus as defined in claim 1, wherein the spring and lever biasing means comprises a lever one end of which is pivotally connected with the platform and the other end of which engages said strut member adjacent the platform end thereof, and spring means interconnecting said other end of said lever and the strut member, said spring means being connected with said strut member at a location between said other end of said lever and said platform support.

16. Apparatus as defined in claim 15, wherein said biasing means further includes torsion spring means arranged at the platform support end of said strut member for urging said platform toward its storage position, said other end of the lever being guided for movement along the strut member.

17. Apparatus as defined in claim 13, wherein said other end of the lever carries roller means, and further wherein said strut member carries slide means for slidably receiving said roller means.

* * * * *